R. HOFFHEINS.
Reaping Machine.
No. 77,486.                              Patented May 5, 1868.
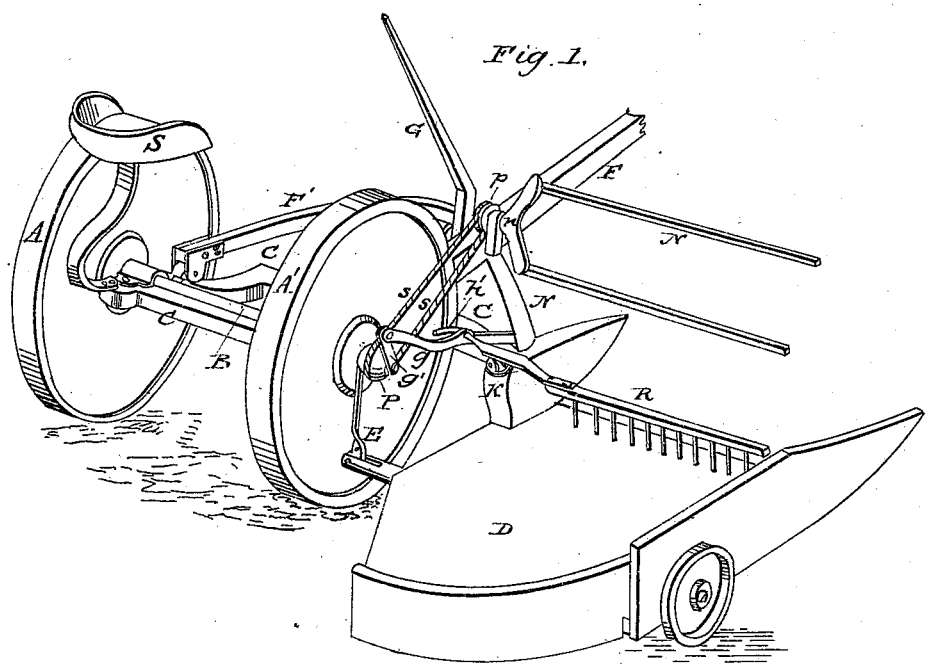
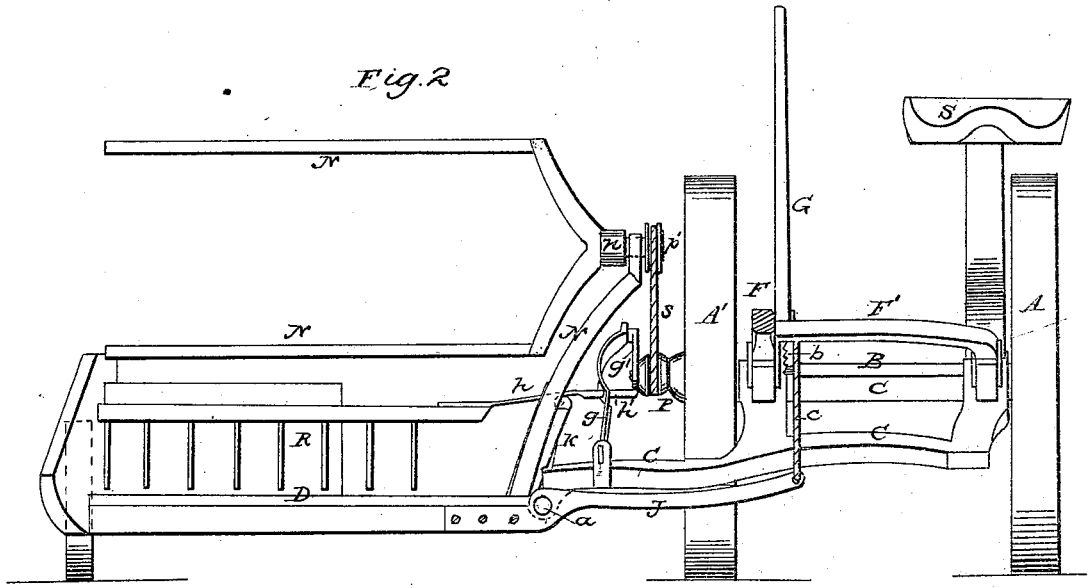

United States Patent Office.

REUBEN HOFFHEINS, OF DOVER, PENNSYLVANIA.

Letters Patent No. 77,486, dated May 5, 1868; antedated April 22, 1868.

IMPROVEMENT IN REAPING-MACHINES.

*The Schedule referred to in these Letters Patent and making part of the same.*

TO ALL WHOM IT MAY CONCERN:

Be it known that I, REUBEN HOFFHEINS, of Dover, in the county of York, and State of Pennsylvania, have invented a new and improved Reaping and Mowing-Machine; and I do hereby declare that the following is a full, clear, and exact description thereof, reference being had to the accompanying drawings, making a part of this specification, in which—

Figure 1 is a perspective view of my improved machine.

Figure 2 is an elevation of the front part of the machine, showing the hinged connection of the platform with the frame of the carriage.

Similar letters of reference indicate corresponding parts in both figures.

The invention which constitutes the subject-matter of this patent is a combination of elements, hereinafter described, with a harvester, which has its cutting-apparatus arranged forward of the main axle, such cutting-apparatus being hinged to a frame or devices which articulate on said main axle.

The object of this invention is to construct a combined reaping and mowing-machine with a platform which is susceptible of being elevated or depressed, according to the height of cut required, by means of a lifting-device, which is under the control of a person mounted upon the frame of the machine, and to combine with such provisions a rake which will sweep the grain from the platform, and which shall not be affected in its operation by said elevation and depression of the platform or cutting-apparatus, all as will be hereinafter described.

To enable others skilled in the art to understand my invention, I will proceed to describe one mode of carrying it into practice.

In the accompanying drawings, I have represented my invention applied to what is denominated a right-hand two-wheel machine; but it will be obvious from the following description that the platform and cutting-apparatus may be arranged on the left-hand side of the drive-wheels, without in any manner changing the character of the invention.

A A' represent two carriage-wheels, to the axle B of which a frame, C, is hinged. One portion of this frame C is curved around in front of the wheel A', for the purpose of having the platform D hinged to it, as shown at a, fig. 2. This platform D may be again connected to the axle B of the carriage by means of a pendent support, E, to which a bar of the platform may be pivoted, as shown in fig. 1. This will afford a rear support for the platform, and at the same time allow this platform to rise and fall, or to move about its joint-connection a.

The draught-pole F has a curved brace, F', formed on it, and the rear ends of this forked pole are suitably pivoted to the frame C, near the axle-tree, as shown in figs. 1 and 2, so that the draught will be in or nearly in a line with said axle, and also so that the rising and falling movements of the inclined frame C shall not materially change the position of the rear end of said draught-pole.

The pole F is attached at its rear end, near the wheel A', or nearest that side of the machine to which the patform is hinged, and to this pole the lever G is applied for elevating or lowering the front part of the platform or cutting-apparatus. This lever has a toothed sector, b, secured to it, which is constructed with a groove to receive the upper end of a rope or chain, c, shown in fig. 2. The lower end of the chain c is attached to an arm, J, which projects from the inner part of the platform, as shown in fig. 2. By vibrating the lever G the cutting-apparatus, which should be at the front edge of the platform, together with this edge of the platform, will be elevated or depressed, and thus the height of cut may be regulated. Provision may be made for securing the lever G in the desired position, so that after adjusting the platform, the attendant can have free use of both hands.

The frame C projects out a short distance in rear of the axle-tree B, and has the standard of the driver's seat S secured to it, as shown clearly in fig. 1, thus affording a counter-weight to assist the driver or attendant, while mounted upon the carriage, to elevate the forward part of the platform. The lever G, or other lifting-device which it may be desired to employ in its stead, should be so located, with reference to the location for the driver, that he can conveniently adjust the platform. The driver's seat or position may be located upon any part of the carriage C, or upon any part of any carriage or carriage-frame which it may be desired to employ.

In conjunction with a machine which is so constructed that the driver, whilst mounted upon a carriage, can elevate or depress the cutting-apparatus at pleasure, and in which the platform and cutting-apparatus are allowed to vibrate about a hinged connection, I desire to employ a rake, and to apply it to such a machine so that the movements of this rake will not be affected by said movements of the platform.

This may be effected by mounting the rake-arm, or a projection thereof, upon a post, K, which projects up from the platform, as shown in figs. 1 and 2. The rake R is connected, by means of a curved arm and a universal joint, to the post K, so that this rake can move in a straight course backward over the platform, and then rise and describe a curve in its forward stroke to the front part of the platform. This rake is brought down, at the completion of its forward stroke, and then describes a circle in a plane which is parallel to the platform, so as to deliver the gavel from the rear inner side of this platform in rear of the carriage.

These movements of the rake are made by means of a reciprocating rod, $g$, which receives its motion from a crank, $g'$, attached to the axle B. The curved projection $h'$ of the rake-arm $h$ passes loosely through a hole which is made through the reciprocating rod $g$, and as this rod is moved back and forward, said curved projection slides back and forth through it.

The reel N may be constructed of two or more parallel arms properly secured to a hub, $n$, and this reel may be mounted upon a post, $N'$, projecting from the platform in front of the post K, as shown in figs. 1 and 2. The pulley $p$ on the axle B, and the pulley $p'$ on the reel-axis, together with the band $s$, will rotate the reel-arms and cause them to gather in the standing grain.

It will be seen from the above description, that I have described in general terms the construction of the several parts of the reaping-machine which I have shown in the drawings. I have done this for the reason that I do not confine my invention to the precise construction of rake shown, so long as it has a circularly-sweeping movement on a pivot, and in its movements will not interfere with the attendant who is mounted upon the carriage or supporting-frame of the machine.

Neither do I confine my invention to any definite form of device for elevating or depressing the front end of the platform and cutting-apparatus, as any of the well-known lifting-contrivances may be employed for this purpose.

Neither do I confine my invention to the arrangement of the driver's seat upon that side of the carriage which is furthest from the platform, as this seat may be located in any position or at any point upon said carriage, from which the driver can conveniently operate the adjusting-device for the platform.

Where the reel N is driven by means of a belt, and mounted upon the platform, so as to rise and fall therewith, as herein described, said belt may be allowed to yield, but be kept under proper tension by means of a spring-tension device applied to it in any suitable manner.

The great object of my invention, as will be seen from the above description, is to have the driver mounted upon the machine, instead of compelling him to ride upon one of the horses drawing the machine, and at the same time to employ a rake, an undulating platform, and a device by which the driver can raise or lower the cutting-apparatus at pleasure, according to the height of cut required. This I accomplish by my invention, and cause the rake to move in harmony with the undulating platform, so as to always preserve a proper relation therewith; and at the same time the side draught of the machine, as compared with a machine which has its cutting-apparatus and rake and platform in rear of the main axle, is greatly reduced, while the ease with which the driver, while sitting on the machine and when the machine is in motion or operation, can raise and lower the cutting-apparatus, platform, and rake together, is greatly increased.

Having thus described my invention, what I claim as new, and desire to secure by Letters Patent, is—

1. A "forward-cut" harvesting-machine which has its finger-beam or cutting-apparatus hinged to a frame, which articulates on the axle of the driving-wheels, without materially affecting the position of the draught-frame and tongue, and to which finger-beam is attached a platform carrying a circularly-moving sweep-rake, said harvesting-machine also having a device for adjusting the cutting-apparatus, and a seat for the driver, such seat being in such relation to the adjusting-device that the driver can raise and lower the cutting-apparatus, platform, and rake while the machine is in operation, and while he is seated, substantially as set forth.

2. The combination of a forward-cut hinged cutting-apparatus, a frame articulating on the main axle, a quadrant platform, a sweep-rake, and a reel moving in harmony with the platform and cutting-apparatus, a driver's seat on the draught-frame, and a device for raising and lowering the cutting-apparatus, platform, rake, and reel while the machine is in motion, and while the driver is seated, substantially as set forth.

3. A circularly-moving sweep-rake, a hinged platform of quadrant form, and a hinged finger-beam, all connected together and moving in harmony with one another, as the platform and finger-beam are caused to rise and fall by the undulations of the ground, in combination with a draught-frame of a "forward-cut" harvester, which has two supporting-wheels applied on a single axle, and which also has a frame and tongue hinged so as to articulate independently of the frame to which the finger-beam is hinged, and which articulates on the said axle, substantially as set forth.

R. HOFFHEINS.

Witnesses:
R. T. CAMPBELL,
EDW. SCHAFER.